United States Patent [19]
Koltz et al.

[11] 3,738,179
[45] June 12, 1973

[54] STORED ENERGY GYRO

[75] Inventors: John M. Koltz, Saddle River; Frank J. Scerbo, Emerson, both of N.J.

[73] Assignee: The Bendix Corporation, Teterboro, N.J.

[22] Filed: Sept. 24, 1971

[21] Appl. No.: 183,314

[52] U.S. Cl. ............................ 74/5.7, 102/DIG. 3
[51] Int. Cl. ..................................... G01c 19/12
[58] Field of Search ...................... 74/5.7, 5.12; 102/DIG. 3

[56] References Cited
UNITED STATES PATENTS

| | | | |
|---|---|---|---|
| 3,393,569 | 7/1968 | Lief | 74/5.12 X |
| 3,287,982 | 11/1966 | Hayner et al. | 74/5.7 |
| 3,162,053 | 12/1964 | Blitz | 74/5.7 |
| 3,102,430 | 9/1963 | Boothroyd et al. | 74/5.7 |

*Primary Examiner*—Manuel A. Antonakas
*Attorney*—Anthony F. Cuoco

[57] ABSTRACT

A stored energy gyro wherein pressurized air is contained in a chamber surrounded by the gyro rotor. Rotor speed is obtained by rupturing a pressure seal in the chamber, with the escaping gas being directed through vanes in the rotor for providing the necessary spin force.

3 Claims, 2 Drawing Figures

PATENTED JUN 12 1973  3,738,179

INVENTORS
JOHN M. KOLTZ
FRANK J. SCERBO
BY
ATTORNEY

STORED ENERGY GYRO

BACKGROUND OF THE INVENTION

1. Field of the Invention

This invention relates generally to gyros and, particularly, to means for imparting spin force to gyro rotors. More particularly, this invention relates to means for storing energy to impart spin force to rotors for expendable gyros such as may be used on artillery missiles.

2. Description of the Prior Art

For increased firing accuracy, artillery missiles, such as anti-tank missiles, require guidance systems using gyros. Since the useful life of the gyro is in the order of 20 seconds reduced cost and simplicity of construction are a necessity. While expendable gyros using air for providing rotor spin forces are known in the art, these gyros have previously required an external air supply and have thus been bulky and costly to provide.

SUMMARY OF THE INVENTION

The device of the invention incorporates a pressurized air supply in the gyroscopic rotor element. The air is contained in a chamber which is surrounded by an outer wall of a dense material such as Sintered Tungsten which forms the rotor. The rotor spins on a shaft and bearing as does the rotor of a conventional gyro and rotor speed is obtained by deflecting the air at an appropriate angle as it escapes from the chamber when a pressure seal is ruptured.

One object of this invention is to provide a stored energy gyro.

Another object of this invention is to incorporate the energy source in the gyro rotor element.

Another object of this invention is to provide a gyro of the type described wherein rotor speed is obtained by deflecting escaping air at an appropriate angle.

Another object of this invention is to provide a stored energy expendable gyro such as may be used in the guidance system of an artillery missile.

The foregoing and other objects and advantages of the invention will appear more fully hereinafter from a consideration of the detailed description which follows, taken together with the accompanying drawings wherein one embodiment of the invention is illustrated by way of example. It is to be expressly understood however, that the drawings are for illustration purposes only and are not to be construed as defining the limits of the invention.

DESCRIPTION OF THE INVENTION

Figure 2:
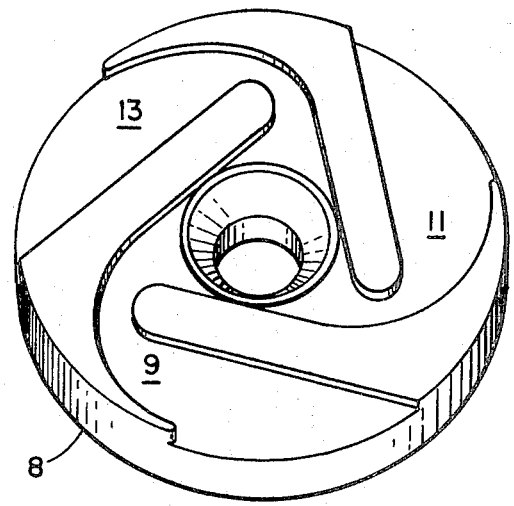
FIG. 2 is a pictorial representation of a rotor end plate including vanes for deflecting escaping air to impart a spin force to the gyro rotor.
Figure 1:
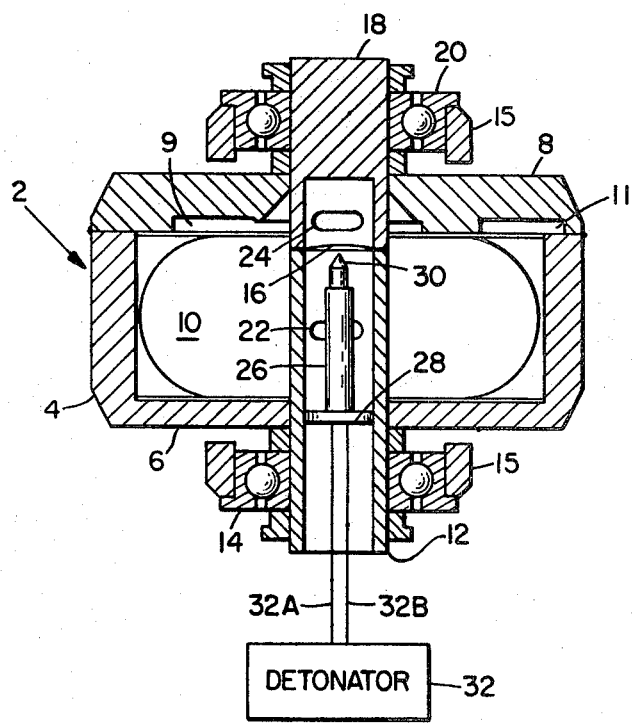
FIG. 1 is a sectioned view of a stored energy gyro according to the invention.

FIG. 1 shows a gyro rotor 2 including an integral outer wall 4 and rim 6 made of a highly dense material such as sintered tungsten to impart a high moment of inertia to the rotor. Rotor 2 includes an end plate 8 also of sintered tungsten which may be suitably brazed to outer wall 4. End plate 8 has vanes 9, 11, 13 as best shown in the pictorial representation of FIG. 2 and the purpose of which will be hereinafter described.

Rotor 2 surrounds a chamber 10 which contains a supply of pressurized air. A hollow shaft 12 which is journaled by a bearing 14 in a gyro inner gimbal 15 extends through rim 6 of rotor 2 and through chamber 10, terminating at a pressure seal 16 which is part of the chamber. A partially hollow shaft 18 which is journaled in gimbal 15 by a bearing 20 extends through end plate 8 terminating at seal 16. Shaft 12 is affixed to rim 6 and shaft 18 is affixed to end plate 8 by suitable means such as brazing.

Shaft 12 includes an inlet port 22 within the hollow portion thereof which opens to chamber 10. Shaft 18 includes an outlet port 24 which opens to allow escaping air to flow through end plate 8.

A sleeve 26 is affixed within shaft 12 and has a pressure seal 28 which seals the hollow portion of the shaft. Sleeve 26 retains a pointed squib 30 which is actuated by a suitable electronic detonating device 32 coupled to the squib by conductors 32A and 32B.

Chamber 10 which may be of a thin gage stainless steel (0.003 in. thick) contains air under a pressure of, for example, 7,000 lbs. per square inch. When pressure seal 16 is intact, the pressurized air is contained in chamber 12 and the hollow portion of shaft 12 delineated by pressure seal 28 of housing 26 and pressure seal 16 of the chamber. The pressurized air enters the hollow portion of the shaft through inlet port 22.

When the artillery missile is fired, detonator 32 is operable to actuate squib 30 which is displaced for rupturing pressure seal 16. The pressurized air escapes through outlet port 24 and is deflected by vanes 9, 11, and 13 to exit end plate 8. The flow of pressurized air through the pressure plate imparts spin force to rotor 2 which spins on shafts 12 and 18 with the required gyroscopic action ensuing.

It will now be seen that the device of the invention incorporates the rotor driving energy in the rotor itself. Air under pressure which is contained in chamber 10 surrounded by rotor 2 is released when squib 30 actuated by detonator 32 ruptures pressure seal 16. The flow of air is directed through plate 8 by vanes 9, 11, and 13 to impart spin force to the rotor. The device is useful in gyros for artillery missiles wherein operation is of short duration and the gyro is expendable.

Although but a single embodiment of the invention has been illustrated and described in detail, it is to be expressly understood that the invention is not limited thereto. Various changes may also be made in the design arrangement of the parts without departing from the spirit and scope of the invention as the same will now be understood by those skilled in the art.

What is claimed is:

1. A stored energy gyro, comprising:
   a rotor mounted for spinning about an axis;
   a chamber surrounded by the rotor and containing a pressurized gas;
   means for rupturing the chamber;
   the rotor including a cylindrical outer wall, a rim at one end of the wall and having an inner surface adjacent the chamber, an end plate at the opposite end of the wall and having an inner surface with a plurality of vanes adjacent the chamber for directing the escaping gas to impart spin force to the rotor;
   an inner gimbal;

a hollow shaft affixed to the rim and journaled in the inner gimbal, said shaft extending through the rim and chamber to the end plate;

a partially hollow shaft affixed to the inner gimbal, the hollow portion extending through the end plate to the hollow shaft; and said shafts terminating at a pressure seal which is part of the chamber.

2. A stored energy gyro as described by claim 1, wherein:

the hollow shaft includes an internal seal and an inlet port between the internal seal and the pressure seal and open to the chamber, with the gas being within the shaft between said seals; and the hollow portion of the partially hollow shaft includes an outlet port open to the inner surface of the end plate.

3. A stored energy gyro as described by claim 2, including:

a squib supported within the hollow shaft;

means for actuating the squib to rupture the pressure seal; and the gas thereupon escaping through the outlet port and directed through the vanes in the end plate to impart spin force to the rotor.

* * * * *